US012791797B2

(12) United States Patent
Trezise et al.

(10) Patent No.: US 12,791,797 B2
(45) Date of Patent: Nov. 10, 2026

(54) DEVICE FOR PROVIDING ENHANCED SIGNAL TRANSMISSION BY AN OPTICAL FIBER CONNECTOR

(71) Applicant: PPC BROADBAND, INC., East Syracuse, NY (US)

(72) Inventors: Shaun Trezise, Aldeburgh (GB); Kim Leeson, Ipswich (GB)

(73) Assignee: PPC BROADBAND, INC., East Syracuse, NY (US)

( * ) Notice: Subject to any disclaimer, the term of this patent is extended or adjusted under 35 U.S.C. 154(b) by 280 days.

(21) Appl. No.: 18/402,121

(22) Filed: Jan. 2, 2024

(65) Prior Publication Data

US 2024/0219647 A1 Jul. 4, 2024

Related U.S. Application Data

(60) Provisional application No. 63/436,516, filed on Dec. 31, 2022.

(51) Int. Cl.
*G02B 6/38* (2006.01)

(52) U.S. Cl.
CPC ......... *G02B 6/3821* (2013.01); *G02B 6/3871* (2013.01)

(58) Field of Classification Search
None
See application file for complete search history.

(56) References Cited

U.S. PATENT DOCUMENTS 5,096,276 A 3/1992 Gerace et al.
5,390,269 A 2/1995 Palacek et al.
(Continued)

FOREIGN PATENT DOCUMENTS

CN 101124500 A 2/2008
CN 105283787 B 5/2018
(Continued)

OTHER PUBLICATIONS

International Search Report and Written Opinion dated Apr. 23, 2024 in corresponding International Application No. PCT/US2024/010038, 20 pages.

(Continued)

*Primary Examiner* — Jerry Rahll
(74) *Attorney, Agent, or Firm* — MH2 TECHNOLOGY LAW GROUP LLP

(57) ABSTRACT

An optical fiber connector subassembly may include a tuning portion coupled with a ferrule and a receiving portion configured to be slidingly moved relative to the tuning portion. The receiving portion may be structurally configured to receive the tuning portion such that the tuning portion is rotationally fixed with the receiving portion. The receiving portion may comprise a bore having a number N of sides, and the tuning portion may comprise an outer surface having N sides configured to be received by the bore in any one of N relative rotational positions between the tuning portion and the receiving portion. The tuning portion may be configured to be rotated relative to the receiving portion so as to arrange the polygonal outer surface and the polygonal bore in one of the N relative rotational positions between the tuning portion and the receiving portion so as to minimize signal transmission loss when the ferrule abuts a mating ferrule.

30 Claims, 4 Drawing Sheets

(56) References Cited

U.S. PATENT DOCUMENTS

| | | | | |
|---|---|---|---|---|
| 6,238,101 | B1 | 5/2001 | Chen et al. | |
| 6,287,018 | B1 | 9/2001 | Andrews et al. | |
| 6,464,402 | B1 * | 10/2002 | Andrews | G02B 6/381 385/56 |
| 6,705,765 | B2 | 3/2004 | Lampert et al. | |
| 6,913,392 | B2 | 7/2005 | Grzegorzewska et al. | |
| 7,189,008 | B2 | 3/2007 | Dye | |
| 7,318,677 | B2 | 1/2008 | Dye | |
| 7,341,382 | B2 | 3/2008 | Dye | |
| 7,530,745 | B2 | 5/2009 | Holmquist | |
| 8,419,294 | B2 | 4/2013 | Hyakutake | |
| 9,081,154 | B2 | 7/2015 | Zimmel et al. | |
| 9,766,413 | B2 | 9/2017 | Zimmel et al. | |
| 10,168,489 | B2 | 1/2019 | Zimmel et al. | |
| 10,620,385 | B2 | 4/2020 | Nhep et al. | |
| 10,663,675 | B2 | 5/2020 | Zimmel et al. | |
| 10,935,736 | B2 * | 3/2021 | Bragg | G02B 6/3898 |
| 11,846,811 | B2 | 12/2023 | Zimmel et al. | |
| 12,019,280 | B2 | 6/2024 | Riepe | |
| 12,072,539 | B2 | 8/2024 | Nhep et al. | |
| 12,105,328 | B2 | 10/2024 | Zhu | |
| 2006/0171638 | A1 | 8/2006 | Dye | |
| 2006/0171639 | A1 * | 8/2006 | Dye | G02B 6/3843 385/78 |
| 2007/0292084 | A1 | 12/2007 | Gurreri et al. | |
| 2010/0254663 | A1 | 10/2010 | Hopkins et al. | |
| 2021/0033796 | A1 * | 2/2021 | Zimmel | G02B 6/3656 |

FOREIGN PATENT DOCUMENTS

| | | | |
|---|---|---|---|
| CN | 108614327 | B | 8/2019 |
| CN | 110609359 | A | 12/2019 |
| EP | 1072914 | A2 | 1/2001 |
| EP | 2920626 | B1 | 4/2021 |
| JP | H11-23905 | A | 1/1999 |
| JP | 4722943 | B2 | 7/2011 |
| JP | 4727674 | B2 | 7/2011 |
| JP | 2017227843 | A | 12/2017 |
| WO | 2017160697 | A1 | 9/2017 |
| WO | 2019152623 | A1 | 8/2019 |

OTHER PUBLICATIONS

International Search Report and Written Opinion dated Nov. 23, 2022 in corresponding International Application No. PCT/US2022/040957, 4 pages.

Indian First Examination Report dated Apr. 17, 2026 in corresponding Indian Application No. 202417016101, 10 pages.

* cited by examiner

DEVICE FOR PROVIDING ENHANCED SIGNAL TRANSMISSION BY AN OPTICAL FIBER CONNECTOR

CROSS-REFERENCE TO RELATED APPLICATION

This application claims the benefit of U.S. Provisional Application No. 63/436,516, filed Dec. 31, 2022, pending, the disclosure of which is hereby incorporated by reference herein in its entirety.

BACKGROUND

The mechanical tolerances involved in terminating single mode optical fiber are much tighter than those for multimode optical fiber. Therefore, while it is quite common for multimode optical fiber to be terminated at the point of use, for example, at a user's premises or at an outside junction box, in most product applications, single mode optical fiber is not terminated in the field. When single mode fiber must be terminated in the field, it can take a skilled technician between about 15 to 20 minutes to splice fibers together either by using a V-groove clamp or expensive fusion welding equipment.

Single mode fiber is therefore often provided in a range of different lengths, pre-terminated at both ends with a connector plug ready to plug into a matching receptacle. Commonly, eight or twelve single mode optical fibers may be bundled together in an optical fiber cable having an outer protective tube inside of which the optical fibers run.

An example of such a connector is the "Subscriber Connector," or SC connector, originally developed by NTT®. SC connectors have convenient push/pull style mating and are approximately square in cross-section and with a 2.5 mm diameter ferule at the termination of the optical fiber, surrounded by a plastic housing for protection. SC connectors are available in single or duplex configurations. The SC connector latches into a matching socket in a simple push motion. The push-pull design includes a spring against which the ferrule slides within a plastic inner housing. This arrangement provides a reliable contact pressure at the ferrule end and resists fiber end face contact damage of the optical fiber during connection. The connector can be quickly disconnected by disengaging a latch, before pulling the optical fiber connector from the socket. Until the latch is thus disengaged, the latch prevents withdrawal of the connector when the optical fiber cable is pulled in a direction away from the socket.

Other examples of push/pull type connectors are LC connectors (Lucent Connectors) or MU connectors. Often, the end face of the ferrule is angled to reduce back reflections and this is usually described by adding APC (Angled Physical Contact) to the name. All such push/pull type optical fiber connectors are for convenience referred to herein as "SC-type" optical fiber connectors. SC-type LC or MU connectors are also known as small form factor connectors, by virtue of having a 1.5 mm diameter ferrule and a plastic housing.

Signal losses within a system often occur within the connection between two optical fiber cores. For example, when the fiber is inserted into the ferrule, the core of a fiber may not and typically does not end up perfectly centered relative to the ferrule outer diameter due to manufacturing tolerances of the ferrule outer diameter to inner diameter concentricity, ferrule inner diameter hole size, fiber outer diameter, and fiber core to fiber outer diameter concentricity.

If one or both of the fibers of mating connectors are off center when they are connected within an adapter, the fibers will not be aligned and thus there will be a signal loss when the signal is transmitted between the two fibers. It is therefore desirable to tune a connector to minimize this signal loss. Tuning can be accomplished by measuring signal characteristics through the connector and/or examining physical properties of the connector and then determining the optimal position of the ferrule and fiber in the connector.

It may be desirable to provide an optical fiber connector having a tuned ferrule that can float when the ferrule engages with a mating ferrule in order to minimize transmission losses.

SUMMARY

In accordance with an exemplary embodiment of the disclosure, an optical fiber connector subassembly configured to reduce signal transmission losses in an optical fiber connector may include a ferrule assembly having a ferrule and a holding portion structurally configured to fixedly hold the ferrule, a receiving portion configured to be rotationally fixed to a fiber cable, and a biasing portion configured to be disposed between the holding portion and the receiving portion. The receiving portion may include a first receiving portion and a second receiving portion, and the holding portion may include a tuning portion. The second receiving portion may include a tuning portion receiving portion structurally configured to receive the tuning portion such that the holding portion is rotationally fixed with the second receiving portion, and the biasing portion may be structurally configured to bias the ferrule assembly toward a front abutment surface portion of the first receiving portion along a connector axis. The tuning portion receiving portion may include a hexagonal bore portion, and the tuning portion may include a hexagonal outer surface portion configured to be received by the hexagonal bore portion in any one of six relative rotational positions between the tuning portion and the tuning portion receiving portion. The holding portion is configured to be moved toward the biasing portion so as to compress the biasing portion and remove the tuning portion from the tuning portion receiving portion such that the holding portion is configured to be rotated relative to the second receiving portion so as to arrange the hexagonal outer surface portion and the hexagonal bore portion in one of the six relative rotational positions between the tuning portion and the tuning portion receiving portion that optimizes eccentricity of the ferrule and a fiber terminated by the ferrule relative to the tuning portion receiving portion so as to minimize signal transmission loss when the ferrule abuts a mating ferrule.

In some embodiments of the optical fiber connector subassembly, a rear end of the biasing portion may be configured to abut a forward facing surface of the hexagonal bore portion. In some aspects, a front end of the biasing portion may be configured to abut a rearward facing surface of the holding portion.

In some embodiments of the optical fiber connector subassembly, the holding portion may include a forward end portion and an extension portion extending from the forward end portion and configured to extend through the biasing portion.

In some embodiments, an optical fiber connector for achieving reduced signal transmission losses between mating ferrules may include an embodiment of the optical fiber connector subassembly and a housing portion configured to receive the connector subassembly.

In some embodiments, the optical fiber connector may include an outer housing portion configured to receive the housing portion and the connector subassembly. In some aspects, the connector may comprise a subscriber (SC) connector.

In accordance with an exemplary embodiment of the disclosure, optical fiber connector subassembly configured to reduce signal transmission losses in an optical fiber connector may include a tuning portion fixedly coupled with a ferrule, a receiving portion configured to be slidingly moved relative to the tuning portion along an axis, and a biasing portion configured to be disposed between the tuning portion and the receiving portion. The receiving portion may be structurally configured to receive the tuning portion such that the tuning portion is rotationally fixed with the receiving portion, the receiving portion may include a polygonal bore portion having N sides, and the tuning portion may include a polygonal outer surface portion configured to be received by the polygonal bore portion in any one of N relative rotational positions between the tuning portion and the receiving portion. The tuning portion may be configured to be slidingly moved so as to compress the biasing portion and remove the tuning portion from the receiving portion such that the tuning portion is configured to be rotated relative to the receiving portion so as to arrange the polygonal outer surface portion and the polygonal bore portion in one of the N relative rotational positions between the tuning portion and the receiving portion that optimizes eccentricity of the ferrule and a fiber terminated by the ferrule relative to the tuning portion receiving portion so as to minimize signal transmission loss when the ferrule abuts a mating ferrule.

In some embodiments of the optical fiber connector subassembly, a rear end of the biasing portion may be configured to abut a forward facing surface portion of the polygonal bore portion. In some aspect, a front end of the biasing portion may be configured to abut a rearward facing surface portion of the tuning portion.

In some embodiments of the optical fiber connector subassembly, the tuning portion may include a holding portion structurally configured to hold a ferrule and an extension portion extending from the holding portion to the polygonal outer surface portion. In some aspects, the extension portion may be configured to extend through the biasing portion.

In some embodiments of the optical fiber connector subassembly, the polygonal outer surface portion may comprise a hexagonal outer surface portion, and the polygonal bore portion may comprise a hexagonal bore portion.

In some embodiments of the optical fiber connector subassembly, the biasing portion may be structurally configured to bias the tuning portion toward a front abutment surface portion of the receiving portion.

In some embodiments, an optical fiber connector for achieving reduced signal transmission losses between mating ferrules may include an embodiment of the optical fiber connector subassembly and a housing portion configured to receive the connector subassembly.

In some embodiments, the optical fiber connector may include an outer housing portion configured to receive the housing portion and the connector subassembly. In some aspects, the connector may comprise a subscriber (SC) connector.

In accordance with an exemplary embodiment of the disclosure, an optical fiber connector subassembly configured to reduce signal transmission losses in an optical fiber connector may include a tuning portion coupled with a ferrule and a receiving portion configured to be slidingly moved relative to the tuning portion. The receiving portion may be structurally configured to receive the tuning portion such that the tuning portion is rotationally fixed with the receiving portion. The receiving portion may comprise a bore having a number N of sides, and the tuning portion may comprise an outer surface having N sides configured to be received by the bore in any one of N relative rotational positions between the tuning portion and the receiving portion. The tuning portion may be configured to be rotated relative to the receiving portion so as to arrange the polygonal outer surface and the polygonal bore in one of the N relative rotational positions between the tuning portion and the receiving portion so as to minimize signal transmission loss when the ferrule abuts a mating ferrule.

In some embodiments, the optical fiber subassembly may include a biasing portion configured to be disposed between the tuning portion and the receiving portion.

In some embodiments of the optical fiber connector subassembly, a rear end of the biasing portion may be configured to abut a forward facing surface portion of the polygonal bore portion. In some aspects, a front end of the biasing portion is configured to abut a rearward facing surface portion of the tuning portion.

In some embodiments of the optical fiber connector subassembly, the tuning portion may comprise a holding portion structurally configured to hold a ferrule and an extension portion extending from the holding portion to the polygonal outer surface portion. In some aspects, the extension portion may be configured to extend through the biasing portion.

In some embodiments of the optical fiber connector subassembly, the biasing portion may be structurally configured to bias the tuning portion toward a front abutment surface portion of the receiving portion.

In some embodiments of the optical fiber connector subassembly, the tuning portion may be configured to be slidingly moved so as to compress the biasing portion and remove the tuning portion from the receiving portion such that the tuning portion is configured to be rotated relative to the receiving portion.

In some embodiments of the optical fiber connector subassembly, the outer surface portion may comprise a hexagonal outer surface portion, and the bore portion may comprise a hexagonal bore portion.

In some embodiments, an optical fiber connector for achieving reduced signal transmission losses between mating ferrules may include an embodiment of the optical fiber connector subassembly and a housing portion configured to receive the connector subassembly.

In some embodiments, the optical fiber connector may include an outer housing portion configured to receive the housing portion and the connector subassembly. In some aspects, the connector may comprise a subscriber (SC) connector.

BRIEF DESCRIPTION OF THE DRAWINGS

Further advantages and features of the present disclosure will become apparent from the following description and the accompanying drawings, to which reference is made.

DETAILED DESCRIPTION

Reference will now be made in detail to exemplary embodiments and methods of the present disclosure, which constitute the best modes of practicing the present disclosure presently known to the inventors. It is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

It must also be noted that, as used in the specification and the appended claims, the singular form "a," "an," and "the" comprise plural referents unless the context clearly indicates otherwise. For example, reference to a component in the singular is intended to comprise a plurality of components.

Figure 1:
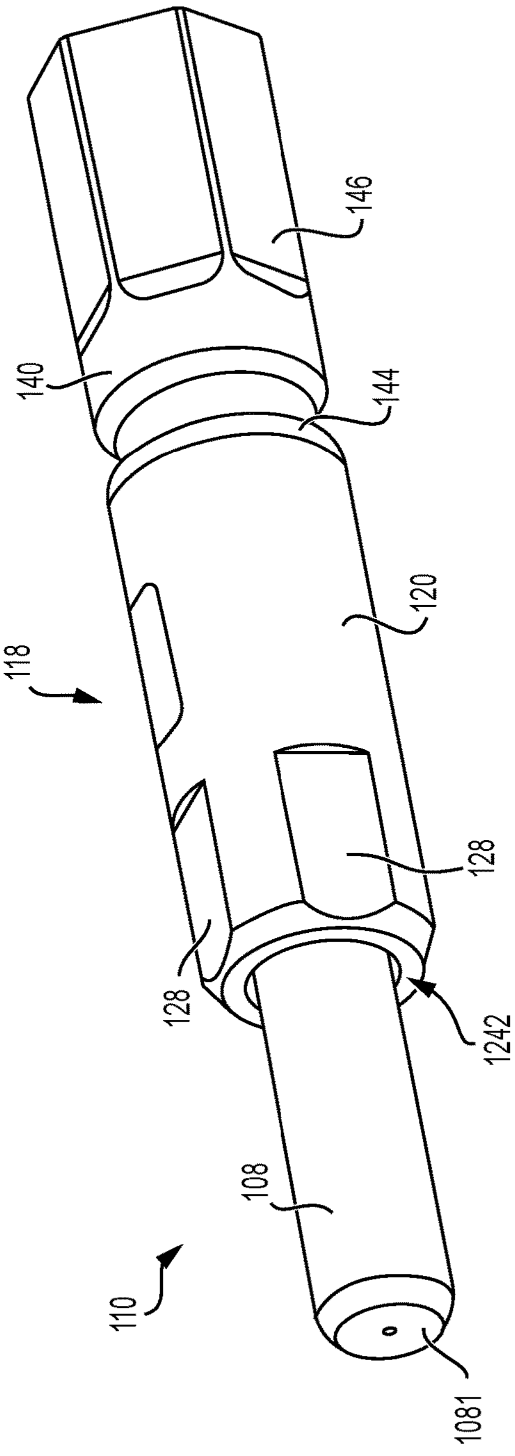
FIG. 1 is a perspective view of an exemplary fiber optic connector subassembly in accordance with various aspects of the disclosure.
Figure 2:
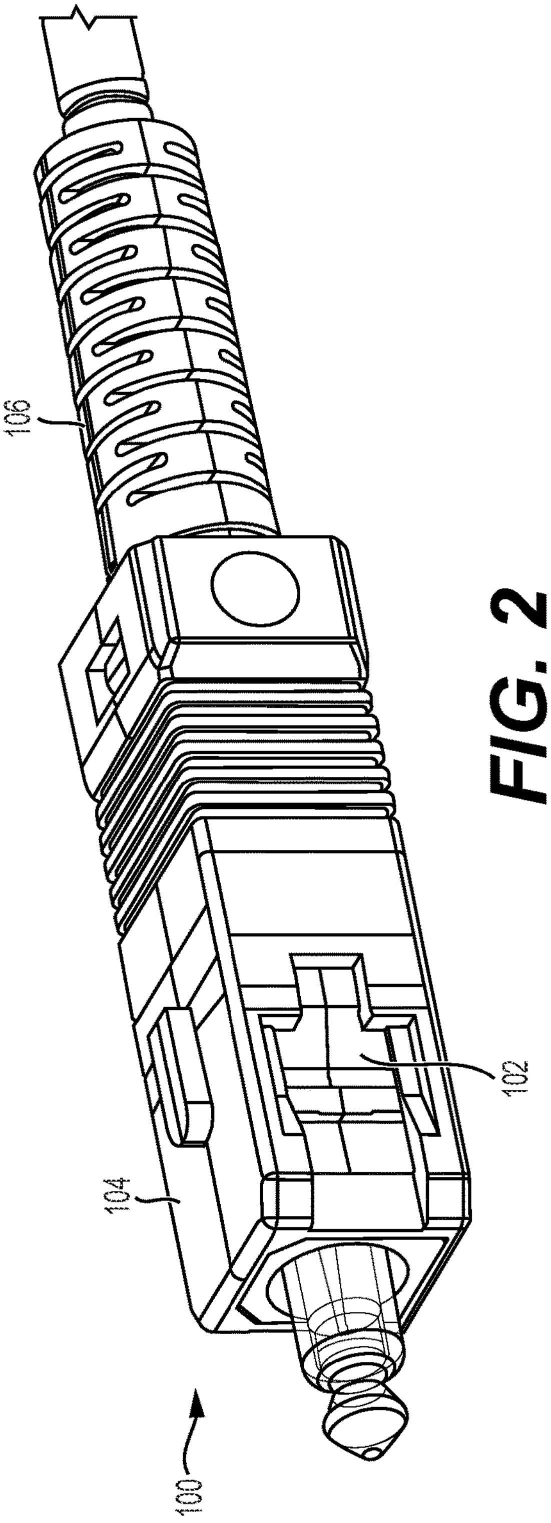
FIG. 2 is a perspective view of an exemplary fiber optic connector that includes the fiber optic connector subassembly of FIG. 1.

With reference to FIGS. 1-8, the present disclosure describes a fiber optic connector 100, for example, an SC connector, including a fiber optic connector subassembly 110, an inner housing 102 configured to be coupled with the fiber optic connector subassembly 110, an outer housing 104 configured to be coupled with the inner housing 102, and a strain relief member 106, for example, a boot, as shown in FIG. 2. The fiber optic subassembly 110, the inner housing 102, the outer housing, and the strain relief member are coupled together in a manner known to those skilled in the art. The fiber optic connector subassembly 110 is configured to be tuned to minimize insertion loss so as to provide a better quality of the optical signal transmission.

Figure 3:
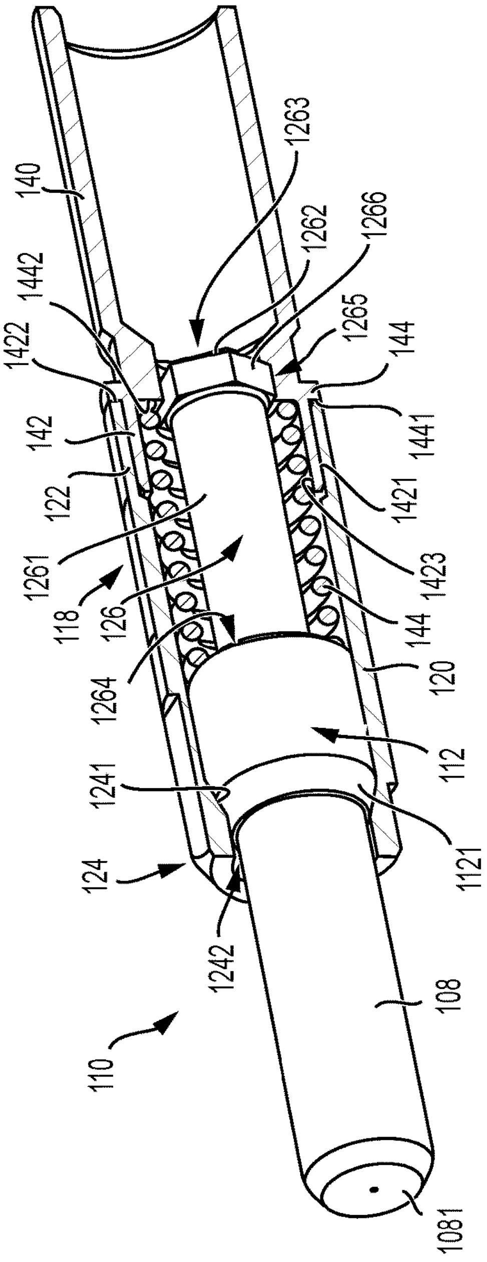
FIG. 3 is a perspective cross sectional view of the fiber optic connector subassembly of FIG. 1.
Figure 4:
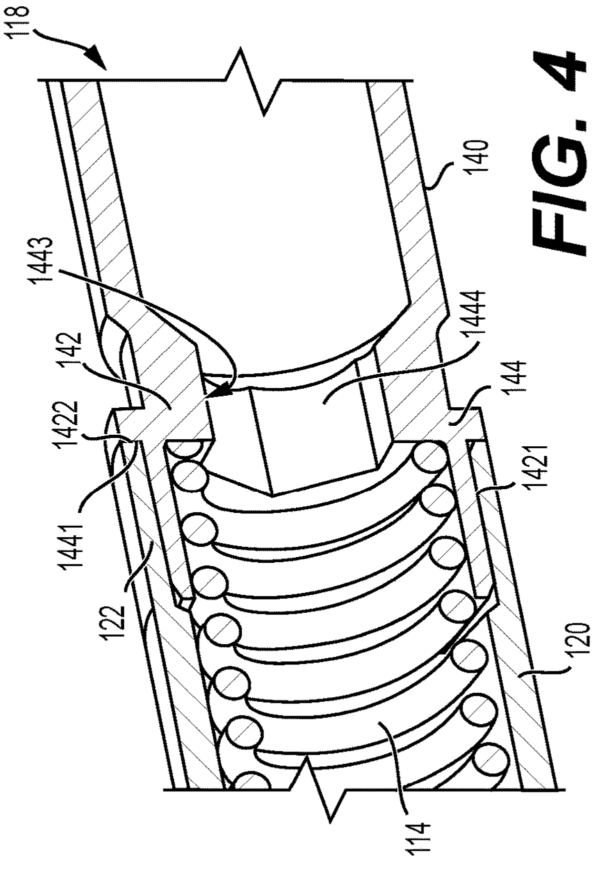
FIG. 4 is a perspective cross sectional view of a portion of the fiber optic connector subassembly of FIG. 1.

As shown in FIGS. 1, 3, and 4, the fiber optic connector subassembly 110 includes a first or front receiving portion 120, for example, a tube or sleeve, and a second or rear receiving portion 140, for example, a tube or sleeve. As best illustrated in FIGS. 3 and 4, a first end portion 122 of the first receiving portion 120 is configured to receive a first end portion 142 of the second receiving portion 140, for example, in a press fit relationship. The second receiving portion 140 may include a flange portion 144 that is configured to extend radially outward from an outer surface portion 1421 of the first end portion 142. The flange portion 144 may be configured to define a surface portion 1441, for example, a forward facing surface portion, that is configured to limit a distance that the first end portion 142 of the second receiving portion 140 can be inserted into the first end portion 122 of the first receiving portion 120 by engaging a surface portion 1422, for example, a rearward facing surface portion, of the first end portion. The flange portion 144 is also configured to extend radially inward from an inner surface 1423 of the first end portion 142 such that an inner surface 1443 of the flange portion 144 is disposed radially inward of the inner surface 1423 of the first end portion 142. The flange portion 144 may be configured to define an engagement portion 1442, for example, a forward facing surface portion, that extends radially outward from the inner surface 1443 of the flange portion 144 to the inner surface 1423 of the first end portion 142.

The first and second receiving portions 120, 140 are configured to cooperate to form a retaining portion 118, for example, a ferrule holder carrier. The fiber optic connector subassembly 110 further includes a ferrule 108 and a holding portion 112, for example, a ferrule holder. The retaining portion 118 is configured to hold and retain the holding portion 112 therein. For example, a first or forward end 124 of the first receiving portion 120 includes a tapered inner surface 1241, and a first or forward end 1121 of the holding portion 112 includes a tapered outer surface 1121. A diameter of a largest end the tapered outer surface 1121 is greater than a diameter of a smallest end of the tapered inner surface 1241 such that the holding portion 112 is prevented from passing through the tapered inner surface 1241 at the first end 124 of the first receiving portion 120.

The first end portion 1121 of the holding portion 112 is configured to receive and hold the ferrule 108 such that the ferrule 108 extends from the first end portion 1121 and extends through the tapered inner surface 1241 at the first end portion 124 of the first receiving portion 120 and out of the retaining portion 108 via an opening 1242 at the first end 124.

The holding portion 112 includes a second end portion 126 comprising, for example, a stem portion 1261 and a flange portion 1262 at a free end 1263 of the second end portion 126. A transition from the first end portion 124 to the second end portion 126 may comprise a stepped transition from the wider first end portion 124 to the narrower stem portion 1261 that defines an engagement portion 1264, for example, a rearward facing surface portion.

Figure 5:
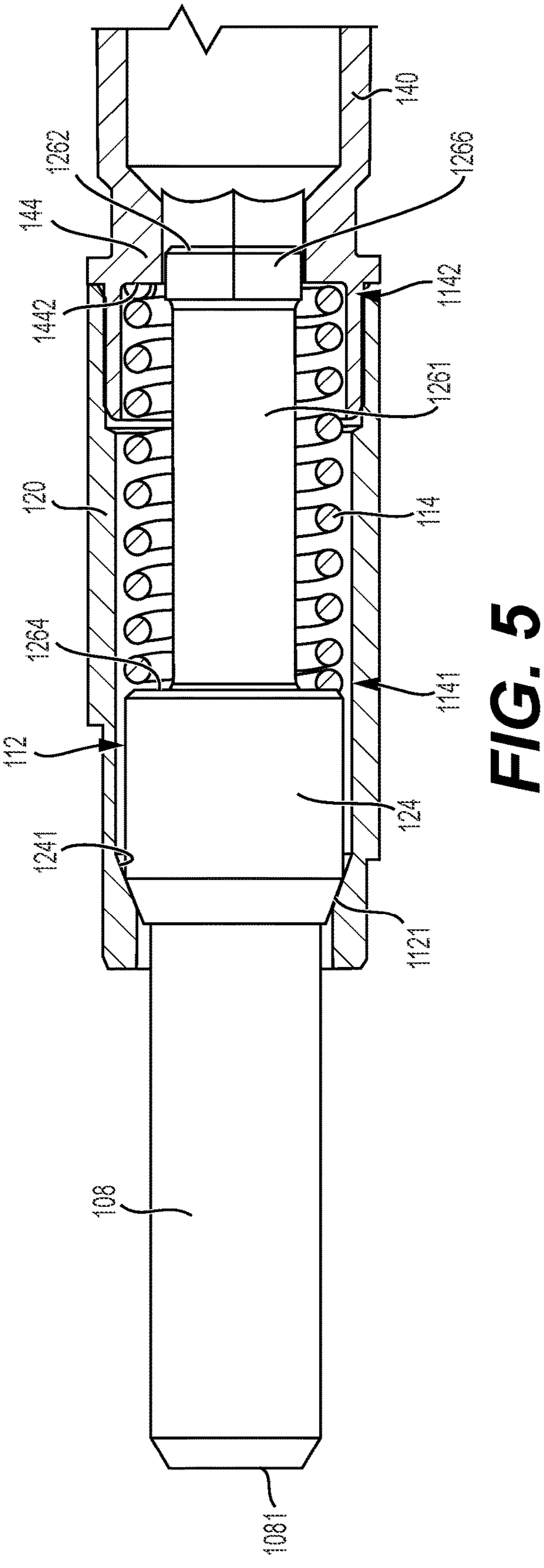
FIG. 5 is a side cross sectional view of the fiber optic connector subassembly of FIG. 1 in a static position of the subassembly.
Figure 6:
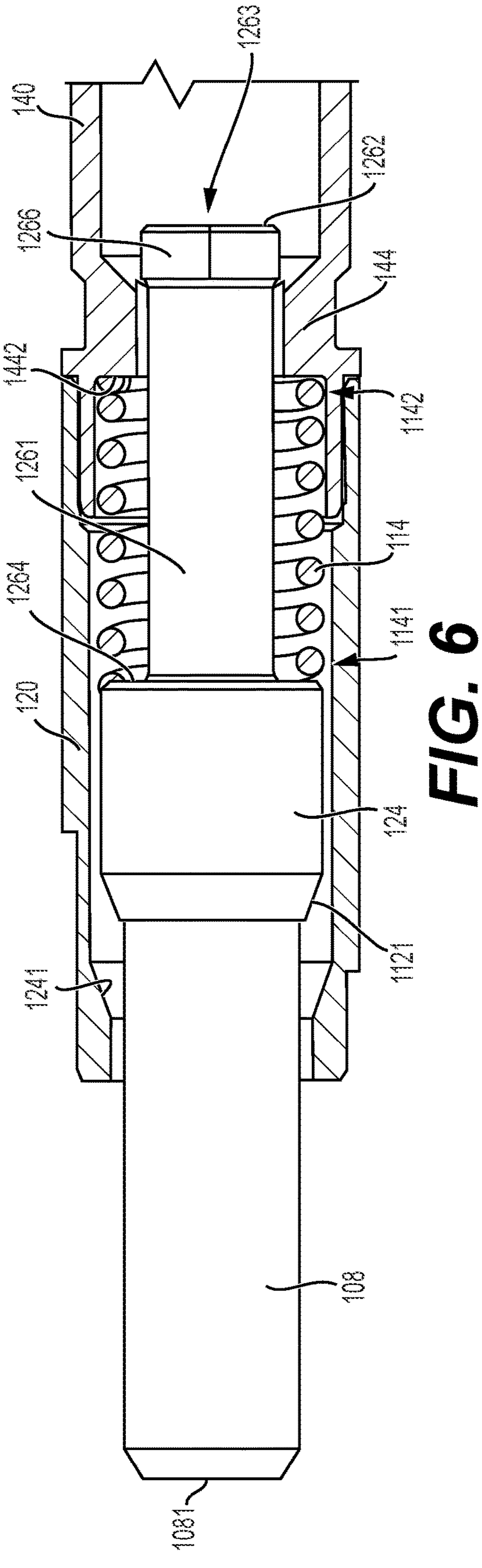
FIG. 6 is a side cross sectional view of the fiber optic connector subassembly of FIG. 1 in a compressed position of the subassembly.

As best illustrated in FIGS. 5 and 6, the fiber optic connector subassembly 110 further includes a biasing member 114, for example, a spring such as a compression spring, disposed in the retaining portion 108 between the holding portion and the second receiving portion 140 and surrounding the stem portion 1261. For example, a first end 1141 of the biasing member 114 is configured to be biased by the engagement portion 1264 of the holding portion 112 in a direction, for example, a rearward direction, toward the second receiving portion 140. And a second end 1142 of the biasing member 114 is configured to be biased by the engagement portion 1442 of the flange portion 144 in a direction, for example, a forward direction, toward the first receiving portion 120

In an exemplary embodiment, the flange portion 1262 comprises a periphery 1265 having six flattened sides 1266. It should be appreciated that, in other embodiments, the flange portion 1262 may have a periphery that includes three sides, four sides, five sides, or more than six sides.

The inner surface 1443 of the flange portion 144 of the second receiving portion 140 includes a broached profile 1444 that is complementary to the shape of the periphery of the flange portion 1262. For example, as illustrated, the periphery 1265 of the flange portion 1262 has six flattened sides 1264, and the inner surface 1443 of the flange portion 144 comprises a broached hexagonal profile that has six sides sized and configured to receive the flange portion 1262.

The number of sides 1264 of the periphery 1265 of the flange portion 1262 and the corresponding number of sides of the broached profile 1444 of the inner surface 1443 of the flange portion 144 determines a number of predetermined tuning positions of the ferrule 108, as will be discussed below. Each of the predetermined tuning positions defines a potential tuning orientation of the ferrule 108 relative to the retaining portion 118 about an axis wherein the ferrule 108 is tuned or optimized. Tuning refers to optimizing fiber core eccentricity by rotating the ferrule 108 in the retaining portion 118 to provide better alignment between mating fibers whose connectors have been tuned.

Referring to FIGS. 5 and 6, the connector subassembly 110 is tuned before terminating a cable 150 with the connector subassembly 110. As shown in FIG. 5, in a static or rest position of the subassembly 110, the holding portion 112 is urged away from the second receiving portion 140 by the biasing member 114 such that the tapered outer surface 1121 of the holding portion 112 engages the tapered inner surface 1241. As shown in FIG. 6, to tune the ferrule 108, the holding portion 112 is moved to a dynamic position by urging the ferrule 108 and the holding portion 112 toward the second receiving portion 140 against the force of the spring 114 until the flange portion 1262 moves axially beyond the flange portion 144 such that the holding portion 112 can be rotated relative to the second receiving portion 140 to any one of the predetermined tuning positions, for example, six tuning positions of the illustrated embodiment.

Figure 7:
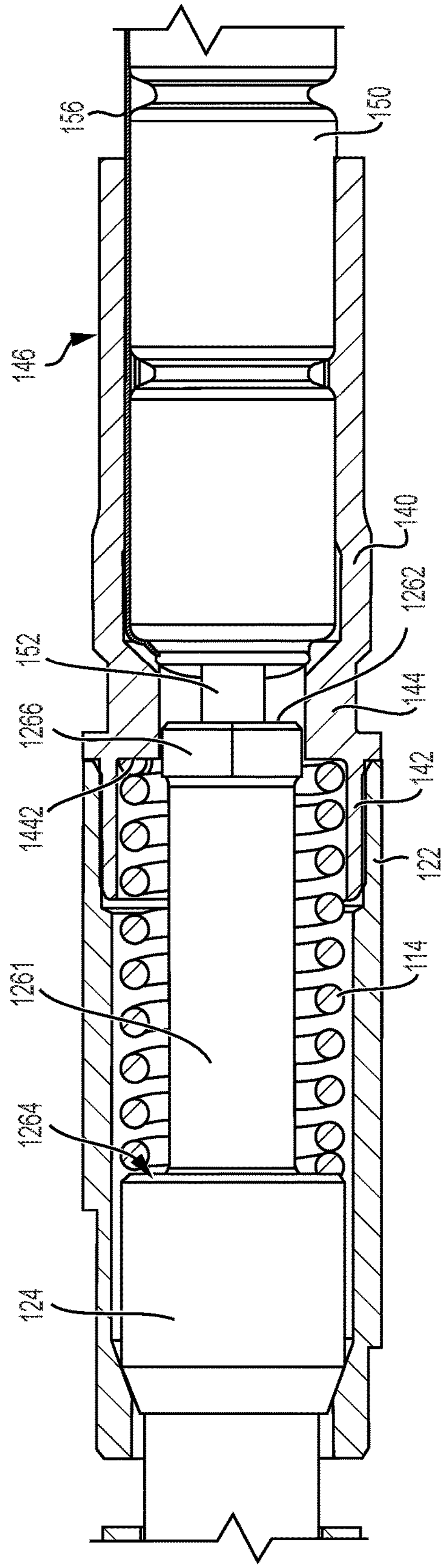
FIG. 7 is a side cross sectional view of the fiber optic connector subassembly of FIG. 1 coupled with an optical fiber cable.
Figure 8:
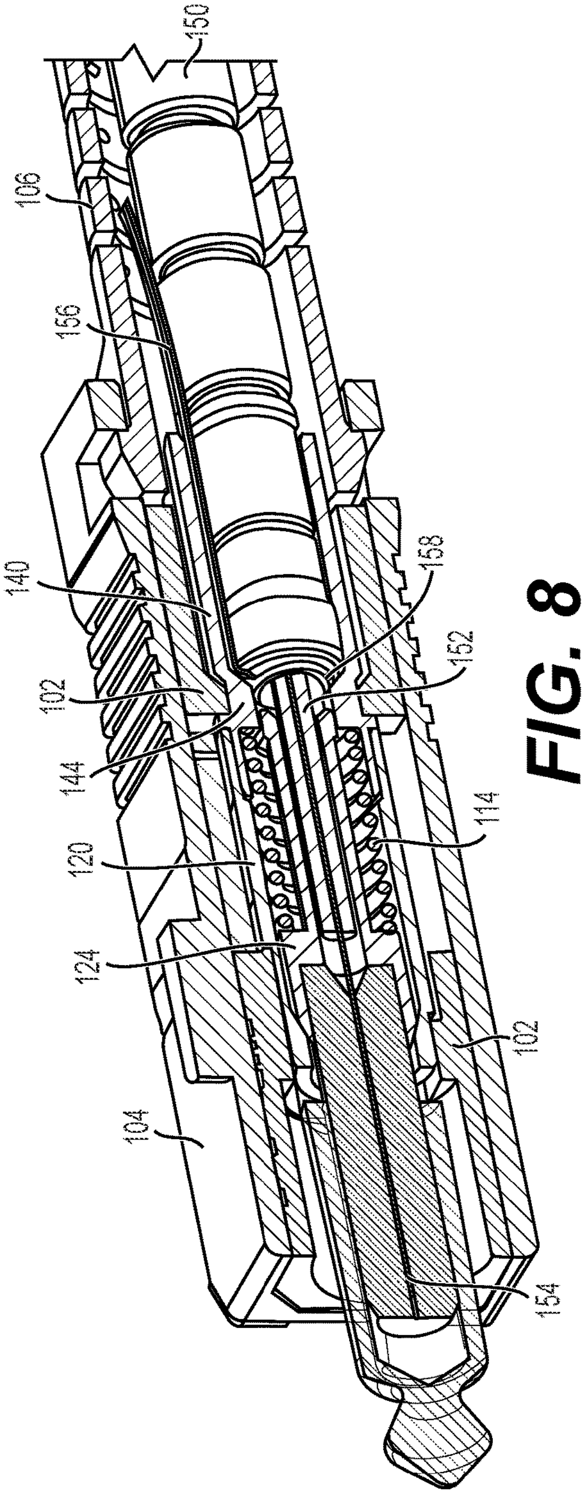
FIG. 8 is a perspective view of an exemplary fiber optic connector that includes the fiber optic connector subassembly of FIG. 1.

Referring now to FIGS. 7 and 8, after the ferrule 108 is tuned by determining which one of the predetermined tuning position optimizes the core eccentricity of the ferrule 108, the holding portion 112 can be “locked” in the optimized predetermined tuning position by terminating a cable with the connector subassembly 110. The fiber cable 150 is prepared by exposing a fiber portion 154 and a coated fiber portion 152 of the cable 150, inserting a support portion 158 under a jacket of the fiber cable 150, feeding the fiber portion 154 and coated fiber portion 152 through the holding portion 112, and terminating the fiber portion 154 with the ferrule 108, as would be understood by persons skilled in the art. The second receiving portion 140 is crimped onto the fiber cable 150 and, optionally, a strengthening member 156 pulled back from the fiber cable 150 at a crimped region 146, as would be understood by persons skilled in the art. The connector subassembly 110 with the tuned ferrule 108 is then coupled with the inner housing 102 and the outer housing 104, as would be understood by persons skilled in the art.

It should be appreciated that a connector subassembly 110 having six predetermined tuning positions permits the ferrule 108 and fiber 154 to be positioned within 30° of the best possible fiber core eccentricity, thereby optimizing alignment between mating fibers whose connectors have also been tuned. Having more predetermined tuning positions would position the ferrule 108 and fiber 154 closer to the best possible fiber core eccentricity, and the opposite would be true if fewer predetermined tuning positions were provided.

It should be understood that, in some aspects, the arrangement of the first receiving portion 120, the second receiving portion 140, the biasing member 114, the holding portion 112, and the ferrule 108 is configured to enable the holding portion 112 and the ferrule 108 to float wherein the angled end face 1081 of the ferrule 108 has the flexibility to move together with mating ferrule when a load is applied to a rear portion of the connector 100 to maintain a connection between their end faces. As a result of the maintained connection between the end faces, the risk of disruption to a signal between the ferrules is significantly reduced. The ferrule 108 and holding portion 112 may also freely move backwards when an end face 1081 of the ferrule 108 comes into contact with a similar end face of another optical fiber ferrule when making an optical connection given that the biasing member 114 may be compressed as the ferrule 108 and holding portion 112 move toward the second receiving portion 140 upon contact with a mating ferrule. Thus, when the holding portion 112 moves toward the second receiving portion 140, the holding portion 112 may no longer contact the abutment surface of the first receiving portion, as described above.

While multiple example, non-limiting embodiments have been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An optical fiber connector subassembly configured to reduce signal transmission losses in an optical fiber connector, comprising:

a ferrule assembly having a ferrule and a holding portion structurally configured to fixedly hold the ferrule;

a receiving portion configured to be rotationally fixed to a fiber cable;

a biasing portion configured to be disposed between the holding portion and the receiving portion;

wherein the receiving portion includes a first receiving portion and a second receiving portion;

wherein the holding portion includes a tuning portion;

wherein the second receiving portion includes a tuning portion receiving portion structurally configured to receive the tuning portion such that the holding portion is rotationally fixed with the second receiving portion;

wherein the biasing portion is structurally configured to bias the ferrule assembly toward a front abutment surface portion of the first receiving portion along a connector axis;

wherein the tuning portion receiving portion comprises a hexagonal bore portion, and the tuning portion comprises a hexagonal outer surface portion configured to be received by the hexagonal bore portion in any one of six relative rotational positions between the tuning portion and the tuning portion receiving portion;

wherein a rear end of the biasing portion is configured to abut a forward facing surface of the hexagonal bore portion, and wherein a front end of the biasing portion is configured to abut a rearward facing surface of the holding portion; and wherein the holding portion is configured to be moved toward the biasing portion so as to compress the biasing portion and remove the tuning portion from the tuning portion receiving portion such that the holding portion is configured to be rotated relative to the second receiving portion so as to arrange the hexagonal outer surface portion and the hexagonal bore portion in one of the six relative rotational positions between the tuning portion and the tuning portion receiving portion that optimizes eccentricity of the ferrule and a fiber terminated by the ferrule relative to the tuning portion receiving portion so as to minimize signal transmission loss when the ferrule abuts a mating ferrule.

2. The optical fiber subassembly of claim 1, wherein the holding portion comprises a forward end portion and an extension portion extending from the forward end portion and configured to extend through the biasing portion.

3. An optical fiber connector for achieving reduced signal transmission losses between mating ferrules, comprising:
- the connector subassembly of claim 1; and
- a housing portion configured to receive the connector subassembly.

4. The optical fiber connector of claim 3, further comprising an outer housing portion configured to receive the housing portion and the connector subassembly; and
- wherein the connector comprising a subscriber (SC) connector.

5. An optical fiber connector subassembly configured to reduce signal transmission losses in an optical fiber connector, comprising:
- a tuning portion fixedly coupled with a ferrule;
- a receiving portion configured to be slidingly moved relative to the tuning portion along an axis;
- a biasing portion configured to be disposed between the tuning portion and the receiving portion;
- wherein the receiving portion is structurally configured to receive the tuning portion such that the tuning portion is rotationally fixed with the receiving portion;
- wherein the receiving portion comprises a polygonal bore portion having N sides, and the tuning portion includes a polygonal outer surface portion configured to be received by the polygonal bore portion in any one of N relative rotational positions between the tuning portion and the receiving portion;
- wherein a rear end of the biasing portion is configured to abat a forward facing surface portion of the polygonal bore portion, and wherein a front end of the biasing portion is configured to abut a rearward facing surface portion of the tuning portion; and
- wherein the tuning portion is configured to be slidingly moved so as to compress the biasing portion and remove the tuning portion from the receiving portion such that the tuning portion is configured to be rotated relative to the receiving portion so as to arrange the polygonal outer surface portion and the polygonal bore portion in one of the N relative rotational positions between the tuning portion and the receiving portion that optimizes eccentricity of the ferrule and a fiber terminated by the ferrule relative to the tuning portion receiving portion so as to minimize signal transmission loss when the ferrule abuts a mating ferrule.

6. The optical fiber subassembly of claim 5, wherein the tuning portion comprises a holding portion structurally configured to hold a ferrule and an extension portion extending from the holding portion to the polygonal outer surface portion; and
- wherein the extension portion is configured to extend through the biasing portion.

7. The optical fiber subassembly of claim 5, wherein the polygonal outer surface portion comprises a hexagonal outer surface portion, and the polygonal bore portion comprises a hexagonal bore portion.

8. The optical fiber subassembly of claim 5, wherein the biasing portion is structurally configured to bias the tuning portion toward a front abutment surface portion of the receiving portion.

9. An optical fiber connector for achieving reduced signal transmission losses between mating ferrules, comprising:
- the connector subassembly of claim 5; and
- a housing portion configured to receive the connector subassembly.

10. The optical fiber connector of claim 9, further comprising an outer housing portion configured to receive the housing portion and the connector subassembly; and
- wherein the connector comprising a subscriber (SC) connector.

11. An optical fiber connector subassembly configured to reduce signal transmission losses in an optical fiber connector, comprising:
- a tuning portion configured to hold a ferrule;
- a receiving portion configured to be slidingly coupled with the tuning portion and structurally configured to receive the tuning portion such that the tuning portion is rotationally fixed with the receiving portion;
- a biasing portion disposed between the tuning portion and the receiving portion;
- wherein the receiving portion comprises a bore portion having a number N of sides, and the tuning portion comprises an outer surface portion having N sides configured to be received by the bore portion in any one of N relative rotational positions between the tuning portion and the receiving portion;
- wherein the biasing portion includes a rear end configured to abut a forward facing surface portion of the bore portion and a front end configured to abut a rearward facing surface portion of the tuning portion; and
- wherein the tuning portion is configured to be removed from the receiving portion such that the tuning portion is configured to be rotated relative to the receiving portion so as to arrange the outer surface and the bore in one of the N relative rotational positions between the tuning portion and the receiving portion that optimizes eccentricity of the ferrule and a fiber terminated by the ferrule relative to the receiving portion so as to minimize signal transmission loss when the ferrule abuts a mating ferrule.

12. The optical fiber subassembly of claim 11, wherein the tuning portion comprises a holding portion structurally configured to hold a ferrule and an extension portion extending from the holding portion to the polygonal outer surface portion; and
- wherein the extension portion is configured to extend through the biasing portion.

13. The optical fiber subassembly of claim 11, wherein the biasing portion is structurally configured to bias the tuning portion toward a front abutment surface portion of the receiving portion.

14. The optical fiber subassembly of claim 11, wherein the tuning portion is configured to be slidingly moved so as to compress the biasing portion and remove the tuning portion from the receiving portion such that the tuning portion is configured to be rotated relative to the receiving portion.

15. The optical fiber subassembly of claim 11, wherein the outer surface portion comprises a hexagonal outer surface portion, and the bore portion comprises a hexagonal bore portion.

16. An optical fiber connector for achieving reduced signal transmission losses between mating ferrules, comprising:

the connector subassembly of claim 11; and a housing portion configured to receive the connector subassembly.

17. The optical fiber connector of claim 16, further comprising an outer housing portion configured to receive the housing portion and the connector subassembly; and wherein the connector comprising a subscriber (SC) connector.

18. A device for providing enhanced signal transmission by an optical fiber connector comprising:

an enhanced optical fiber connector subassembly comprising:

a tuning portion structurally arranged to hold a ferrule;

a receiving portion structurally arranged to be slidingly coupled with the tuning portion and to receive the tuning portion therein such that the tuning portion is rotationally fixed with the receiving portion at one of a plurality of relative rotational positions; and a biasing portion disposed between the tuning portion and the receiving portion;

wherein the tuning portion is structurally arranged to bias the biasing portion toward the receiving portion, and the receiving portion is structurally arranged to bias the biasing portion toward the tuning portion; and wherein the optical fiber connector subassembly is structurally arranged to provide enhanced signal transmission by an optical fiber connector by permitting a portion of the tuning portion to be removed from the receiving portion such that the tuning portion is permitted to be rotated relative to the receiving portion so as to arrange the tuning portion and the receiving portion in one of the plurality of relative rotational positions such that an eccentricity of the ferrule and a fiber terminated by the ferrule is optimized relative to the receiving portion thereby minimizing signal transmission loss when the ferrule abuts a mating ferrule during operation.

19. The device of claim 18, wherein the tuning portion comprises a holding portion structurally arranged to hold a ferrule and an extension portion extending from the holding portion to the outer surface portion; and wherein the extension portion is structurally arranged to extend through the biasing portion.

20. The device of claim 18, wherein the biasing portion is structurally arranged to bias the tuning portion toward a front abutment surface portion of the receiving portion.

21. The device of claim 18, wherein the tuning portion is structurally arranged to be slidingly moved so as to compress the biasing portion and remove the portion of the tuning portion from the receiving portion such that the tuning portion is structurally arranged to be rotated relative to the receiving portion.

22. The device of claim 18, wherein the tuning portion includes a first engagement portion structurally arranged to bias the biasing portion toward the receiving portion, and the receiving portion includes a second engagement portion structurally arranged to bias the biasing portion toward the tuning portion.

23. The device of claim 18, wherein the portion of the receiving portion comprises a number N of sides, and a portion of the tuning portion comprises an outer surface portion having N sides structurally arranged to be received by the portion of the receiving portion in any one of N relative rotational positions between the tuning portion and the receiving portion.

24. The device of claim 23, wherein the tuning portion is permitted to be rotated relative to the receiving portion so as to arrange the outer surface portion and the portion of the receiving portoin in one of the N relative rotational positions between the tuning portion and the receiving portion such that an eccentricity of the ferrule and a fiber terminated by the ferrule is optimized relative to the receiving portion thereby minimizing signal transmission loss when the ferrule abuts a mating ferrule.

25. The device of claim 18, wherein the outer surface portion comprises a polygonal outer surface portion, and the receiving portion comprises a polygonal bore portion.

26. The device of claim 25, wherein the polygonal outer surface portion comprises a hexagonal outer surface portion, and the polygonal bore portion comprises a hexagonal bore portion.

27. The device of claim 18, wherein the biasing portion includes a rear end portion structurally arranged to abut a forward facing surface portion of the receiving portion and a front end portion structurally arranged to abut a rearward facing surface portion of the tuning portion.

28. The device of claim 18, wherein the receiving portion includes a first receiving portion and a second receiving portion.

29. An optical fiber connector for achieving reduced signal transmission losses between mating ferrules, comprising:

the device of claim 18; and a housing portion structurally arranged to receive the optical fiber connector subassembly.

30. The optical fiber connector of claim 29, further comprising an outer housing portion structurally arranged to receive the housing portion and the connector subassembly; and wherein the connector comprising a subscriber (SC) connector.

* * * * *